United States Patent Office 3,160,494
Patented Dec. 8, 1964

3,160,494
GRANULAR PESTICIDAL COMPOSITION EMPLOYING COFFEE GROUNDS AS CARRIER MEDIUM
Werner Duyfjes, Amsterdam, Netherlands, assignor to North American Philips Company, Inc., New York, N.Y., a corporation of Delaware
No Drawing. Filed Nov. 8, 1961, Ser. No. 150,906
Claims priority, application Netherlands, Nov. 21, 1960, 258,201
6 Claims. (Cl. 71—2.3)

In the United States Patent 2,792,295, the use of a granular carrier medium for herbicidal compositions is described. The advantage of the use of such a carrier is that when scattering the composition from the air by aircraft, only a small air-drift occurs thus reducing the damage, if any, to vegetation on fields lying outside the fields to be treated.

However, the use of a granular carrier medium described in this patent has the disadvantage in that no volatile esters of the hormone type herbicide may be employed as active substances, because their efficacy is substantially lost during the granulation process.

A principal object, therefore, of my invention is to provide an improved granular carrier medium for volatile herbicides and other volatile pesticides.

This and other objects of my invention will be apparent from the description that follows.

According to the invention the applicant has unexpectedly found that the waste product obtained by evaporating extracts of ground coffee beans which is known as coffee grounds is an excellent granular carrier for pesticidal preparations particularly volatile pesticidal compositions.

It has been found that the use of coffee grounds as the carrier medium has various advantages.

On preparing granular pesticidal compositions, the active substance is distributed over the carrier, in most of the cases by means of a liquid, either as a solution or as an emulsion or suspension. In order to obtain in a definite case a nearly homogeneous distribution of the active substance over the carrier, a definite quantity of liquid is required.

It was found that when using coffee grounds as the carrier medium, the quantity of liquid, with which such a distribution of the active substance can be obtained, is considerably smaller than in the case of the commonly used granular carrier media, such as, e.g., super phosphate, kaolin, attapulgite, lime and chalk. The minimum quantities of liquid required to obtain a substantially homogeneous distribution of the active substance over the carrier, may be 2–4 times smaller in the case of coffee grounds than when applying a commonly used carrier medium.

The advantage of the smaller consumption of liquid when preparing granular pesticides according to the invention not only lies in the smaller consumption of liquid but also in the fact that often the resulting preparation need not be subjected to a drying process to remove part of the liquid used. This advantage holds in particular when using water as diluting-agent of the pesticidal substance to be distributed over the carrier.

A particular advantage of the use of coffee grounds also lies in the fact that comparatively volatile substances may be used as active substances, also owing to the fact, that the drying-process may be omitted when preparing the compositions and that the granules in particular have the property of more or less retaining the active substance and giving it off comparatively slowly. Because of this the duration of action of the pesticidal preparations is prolonged not only for comparatively volatile active substances but also for other active substances. In many cases a prolongation of the duration of action of a pesticidal preparation may be of importance, e.g., in preventive uses.

Applicant has also found that the granules of the coffee grounds have a high resistance to wear, and is much better than that of attapulgite. A large resistance to wear is of importance for a granular pesticide in order to prevent the formation of undesired smaller particles during mixing.

The use of coffee grounds as a carrier medium is of advantage when preparing herbicidal compositions having as an active substance, for example, 2,4-dichlorophenoxyacetic acid, 4-chloro-2-methylenoxy acetic acid, 2,4,5-trichlorophenoxy acetic acid, esters, salts and amides thereof, 2,4-bis(ethylamino)-6-chlorotriazine-1,3,5 and in particular 2,6-dichlorobenzonitrile or 2,4,6-trichlorobenzonitrile. Also the coffee grounds is of advantage as a carrier for insecticidal preparations having as active substance, for example, 1,1-di(4-chlorophenyl)-2,2,2-trichloroethane, 1,2,3,4,10,10-hexachloro-1,4,4a,5,8,8a-hexahydroendo-1,4-exo-5,8-dimethanonaphthalene ("Aldrin") or hexachlorocyclohexane. In addition the coffee grounds may also be advantageously employed with other pesticidal, for example, acaricidal, fungicidal or nematocidal preparations having as active substance, for example, 2,4,5,4'-tetrachlorodiphenylsulphone, 2,4,5,4'-tetrachlorodiphenylsulphide, O,O-diethyl-O-4-nitrophenylthionophosphate, O,O-dimethyl-S-(1,2-di(ethoxy-carboxyl)-ethyl)dithiophosphate, zinc-ethylene-1,2-bisdithiocarbamate, triphenyl tin acetate or dichloropropene In addition applicant has found that the use of coffee grounds as a carrier material in a germination inhibitor for potatoes has important advantages over the use of other carrier media. Such a composition having coffee grounds as a carrier medium does not adhere to the potatoes. This results in two important advantages: firstly, the substances consequently exert their action substantially entirely via the vapor phase, as a result of which a possible overdosing is avoided, secondly, substantially none active substance is retained on the potatoes.

When producing compositions according to the invention, the commonly used surface-active substances, dispersion agents and/or adhesives may be used.

Example 1

100 parts by weight of coffee grounds were intimately mixed with a suspension of 2 parts by weight of 2,6-dichlorobenzonitrile, 2 parts by weight of polyoxyethylene sorbitan fatty acid ester and 3 parts by weight of sodium lignine-sulphonate in 11 parts by weight of water.

In order to obtain the same intimate mixture with the active substance in the case of granular attapulgite as a carrier medium, at least 42 parts by weight of water had to be used for 100 parts by weight of carrier medium.

Example 2

For a homogeneous distribution of 4 parts by weight of "Aldrin" over 100 parts by weight of coffee grounds, the use of 7.7 parts by weight of xylene were required (while using the quantities of surface-active substance and dispersion agent as stated in Example 1).

To obtain the same distribution with 100 parts by weight of granular attaclay, at least 47 parts by weight of xylene were required.

While I have described my invention in connection with specific embodiments and applications, other modifications thereof will be readily apparent to those skilled in this art without departing from the spirit and scope of the invention as defined in the appended claims.

What I claim is:
1. A free flowing granular pesticidal composition comprising a pesticidal amount of a pesticidal agent dis- tributed on coffee grounds, said pesticidal composition being prepared by mixing said pesticidal agent, a liquid carrier for said pesticidal agent and the coffee grounds, said liquid carrier being employed in an amount sufficient to obtain a substantially homogeneous distribution of the pesticidal agent over the coffee grounds.

2. A free flowing granular herbicidal composition comprising a herbicidal amount of a herbicidal agent distributed on coffee grounds, said herbicidal composition being prepared by mixing said herbicidal agent, a liquid carrier for said herbicidal agent and the coffee grounds, said liquid carrier being employed in an amount sufficient to obtain a substantially homogeneous distribution of the herbicidal agent over the coffee grounds.

3. A free flowing granular insecticidal composition comprising an insecticidal amount of an insecticidal agent distributed on coffee grounds, said insecticidal composition being prepared by mixing said insecticidal agent, a liquid carrier for said insecticidal agent and the coffee grounds, said liquid carrier being employed in an amount sufficient to obatin a substantially homogeneous distribution of the insecticidal agent over the coffee grounds.

4. A free flowing granular nematocidal composition comprising a nematocidal amount of a nematocidal agent distributed on coffee grounds, said nematocidal composition being prepared by mixing said nematocidal agent, a liquid carrier for said nematocidal agent and the coffee grounds, said liquid carrier being employed in an amount sufficient to obtain a substantially homogeneous distribution of the nematocidal agent over the coffee grounds.

5. A free flowing granular fungicidal composition comprising a fungicidal amount of a fungicidal agent distributed on coffee grounds, said fungicidal composition being prepared by mixing said fungicidal agent, a liquid carrier for said fungicidal agent and the coffee grounds, said liquid carrier being employed in an amount sufficient to obtain a substantially homogeneous distribution of the fungicidal agent over the coffee grounds.

6. A free flowing granular acaricidal composition comprising an acaricidal amount of an acaricidal agent distributed on coffee grounds, said acaricidal composition being prepared by mixing said acaricidal agent, a liquid carrier for said acaricidal agent and the coffee grounds, said liquid carrier being employed in an amount sufficient to obtain a substantially homogeneous distribution of the acaricidal agent over the coffee grounds.

References Cited in the file of this patent

UNITED STATES PATENTS

| 2,248,159 | Boyd | July 8, 1951 |
| 2,820,703 | Dresser et al. | Jan. 21, 1958 |

FOREIGN PATENTS

| 133,586 | Great Britain | Oct. 16 1919 |